United States Patent
McNabb

[15] 3,698,245
[45] Oct. 17, 1972

[54] FLUID OSCILLATOR FLOWMETER

[72] Inventor: George C. McNabb, Attleboro, Mass.

[73] Assignee: The Foxboro Company, Foxboro, Mass.

[22] Filed: April 14, 1970

[21] Appl. No.: 28,331

[52] U.S. Cl. .................................73/194 B, 73/70.2
[51] Int. Cl. ..............................................G01f 1/00
[58] Field of Search ..73/194 C, 194 B, 70.2; 310/25; 84/363; 46/180

[56] References Cited

UNITED STATES PATENTS

| | | | |
|---|---|---|---|
| 2,519,015 | 8/1950 | Bensen | 73/194 B UX |
| 2,809,520 | 10/1957 | Richard, Jr. | 73/194 B X |
| 3,116,639 | 1/1964 | Bird | 73/194 B |

*Primary Examiner*—Jerry W. Myracle
*Attorney*—Lawrence H. Poeton

[57] ABSTRACT

A flowmeter for measuring liquid or gas flow based on flow-induced resilient oscillation of a reed in the flow passage of the meter. An output sensor responds to the oscillations to produce a frequency output. The oscillations are produced by alternately retarding and accelerating each of two parallel flow paths. Between these flow paths is mounted a vane, resiliently spring at its downstream end, having a bulbous nose piece at its upstream end, and with a significant 'sail' area in its middle portion.

19 Claims, 12 Drawing Figures

INVENTOR.
GEORGE C. McNABB

INVENTOR.
GEORGE C. McNABB

INVENTOR.
GEORGE C. McNABB

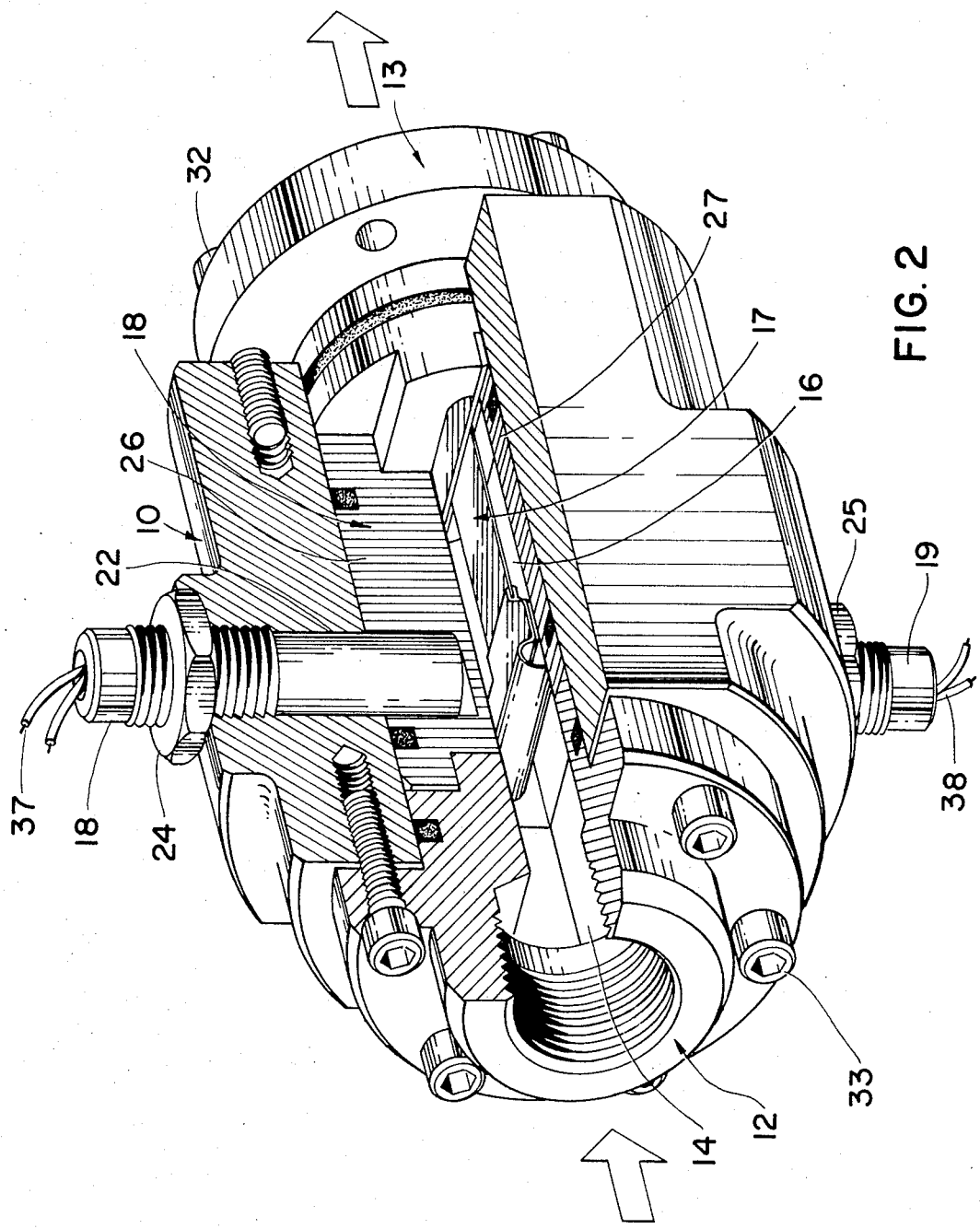

3,698,245

FLUID OSCILLATOR FLOWMETER

This invention relates to flowmeters and is a device for metering either gas or liquid. The operation of the device of this invention is based on oscillation produced by fluid flow and resultant differential pressure effects on a resilient reed structure in the flowmeter.

Various forms of flowmeters are available for various purposes and applications. In order to achieve different purposes, flowmeters often have features which are accepted to achieve the particular purpose. For example, orifice meters are not linear in terms of flow measurement. Their rangeability is limited and their output systems can be complicated and expensive. Such meters, and others, do not provide a frequency, digital type of output. Many are expensive, difficult to service by cleaning, replacing parts, inspecting, and the like. Previous moving part meters, such as rotary meters, may have difficulties with bearings, or may require relatively precise flow directions. They further tend to have difficulties with errors caused by clogging.

One form of flowmeter has a fixed body in the flow passage. In its operation, the phenomenon known as 'vortex-shedding' occurs as fluid impinges on the body and vortices are shed therefrom. Measurement of flow can be accomplished electrically usually by sensing temperature changes of heated elements on the body. This device thus has electrical (temperature) elements within the stream, directly subject to undesirable effects therefrom. The present invention provides an oscillating reed structure without such difficulties and disadvantages of previous devices.

By way of illustrative example, one form of the flowmeter of this invention uses a reed structure comprising a flat (sail) reed which is resiliently flexible. The reed lies in the flow passage of the meter and from a downstream support mounting of one end of the reed, it extends upstream to a bulbous nose leading edge free end, which is the first portion of the reed structure to meet the on-coming fluid flow. This leading edge may be cylindrical in form, like a log form across the flow stream in the flowmeter.

From a zero flow condition, with the reed structure at rest, usually centered along the length axis of the flow passage, an increase in flow results in alternate vortex-shedding from the leading edge of the reed structure to provide opposite impetus effects and therefore oscillations of the reed structure transversely of the flow passage. When the reed is near or at either wall, essentially parallel and opposite force effects reverse the reed movement. Thus the vortex-shedding is a start-up function, and the operation of the flowmeter is sustained by the reversing forces.

Above a minimum flow, the oscillations of the reed are in linear relation to the flow velocity, over an operating range specific to the combination of all the operating parameters of a particular flowmeter.

The device of this invention lends itself to small, compact design in which the structural elements are simple to make and interchangeably assemble.

An outer sleeve housing contains a split-sleeve inner body which defines the reed-operating area of the flow passage. End caps are provided, with mutually fitting forms with respect to both the inner body and the outer sleeve housing.

The flow passage through the device is essentially of circular cross-section at its upstream and downstream ends, while the reed cross-sectional area of the passage is in the form of a narrow rectangle. The reed oscillation is in the direction of the narrow dimension of this rectangle. Thus the end cap fittings align the reed for this oscillation direction and to properly relate the reed oscillation to the output signal units.

This is a short stroke oscillator. The length of the reed, its degree of resilience, the area of the reed sail, the size and exact form of the leading edge of the reed, as well as the weight of the reed structure and the selected stroke length, are all design parameters, which, with others, are combinable in many ways to provide this device with many design possibilities for a variety of specific applications to different flow problems.

The mechanical oscillations of the reed provide the device with a base structure to which any one of many varieties of signal take-off devices may be applied. It is a linear frequency output flowmeter with wide rangeability, which lends itself to matching line size, and to use in the measurement of low flows through the use of small flow passages and light-weight reed structure. It may be used as a measuring device for the flow of either gases or liquids.

The dynamics of the device may be designed in with some variation by providing apertures in the sail area of the reed to provide a degree of alternately reversing cross-flow through the reed.

It is an object of this invention to provide a linear frequency output flow meter.

It is a further object to provide a flowmeter whose size can be matched to line size.

It is a further object to provide a flowmeter which readily lends itself to various forms of simple and easily applied output systems and sensor devices.

It is a further object to provide a flowmeter which is highly sensitive to low flows.

Other objects and advantages of this invention will be in part apparent and in part pointed out hereinafter and in the accompanying drawings, wherein:

FIG. 2 is a half-section view of the structure of FIG. 1, taken vertically and horizontally along the flow axis of the flowmeter, excepting the downstream endcap;

Figure 1:
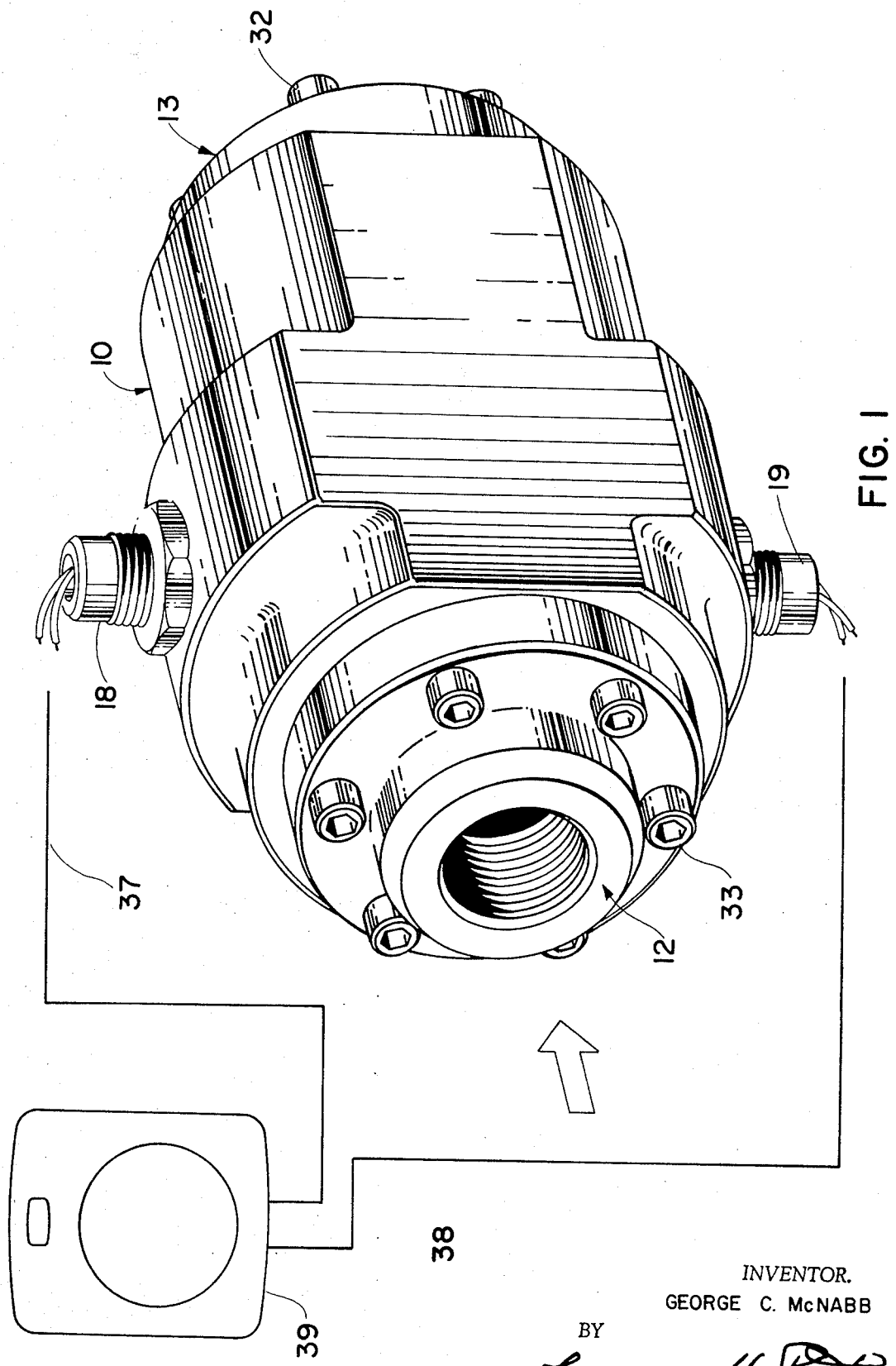
FIG. 1 is an overall external perspective of a flowmeter according to this invention.
Figure 7:
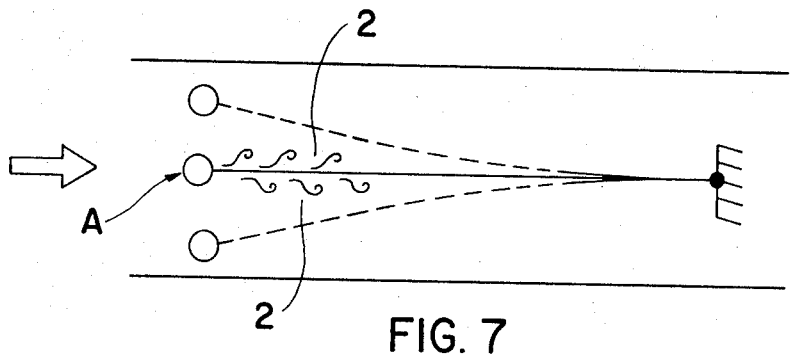
Figure 8:
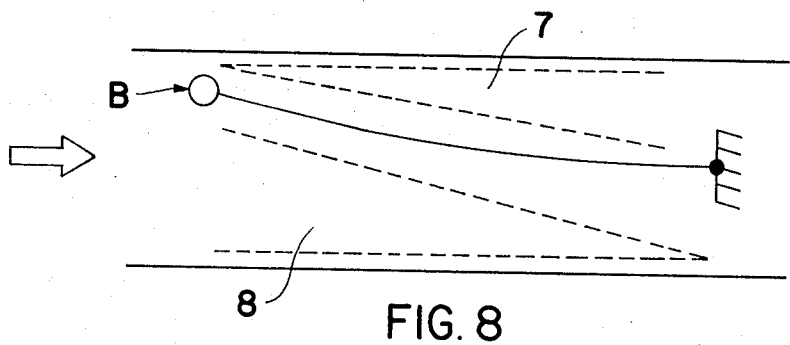
Figure 9:
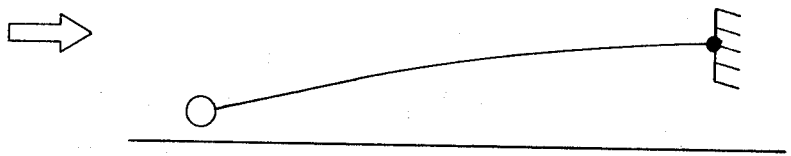
Figure 10:
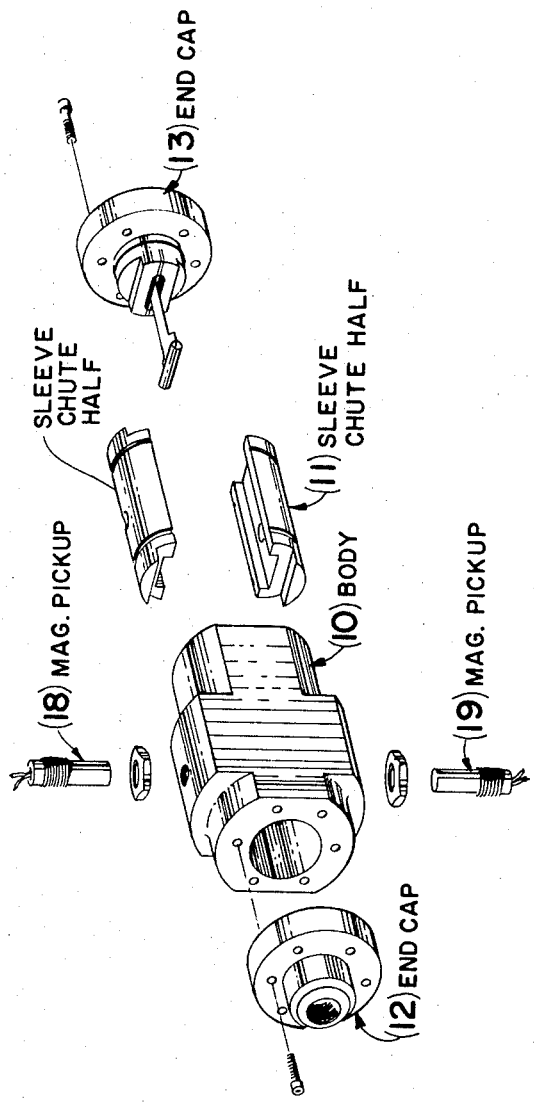
Figure 11:
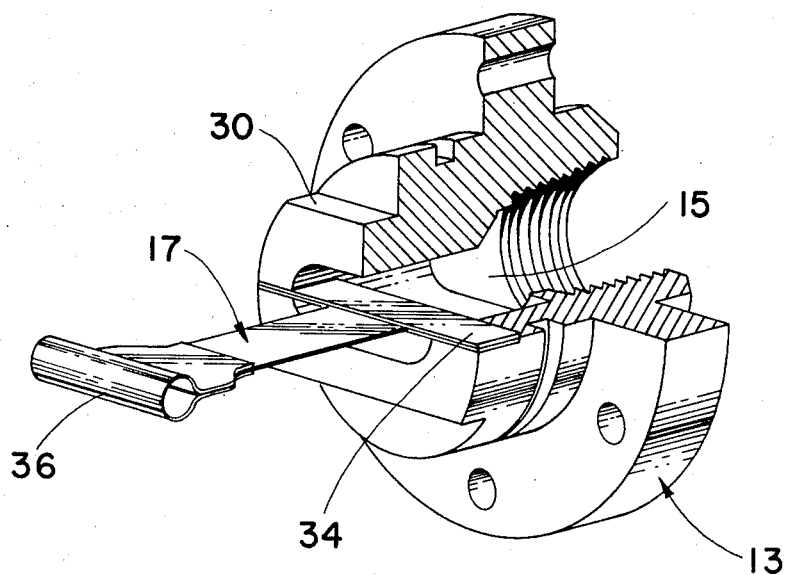
Figure 12:
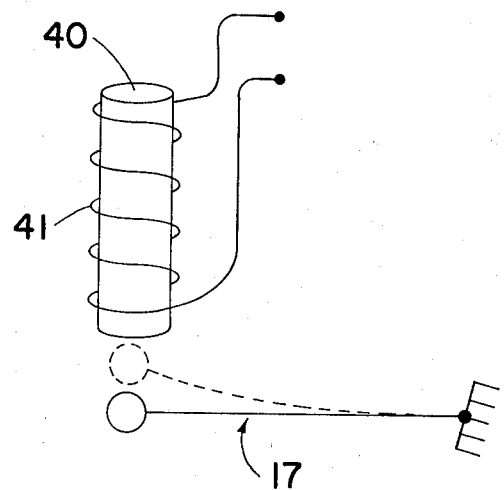

FIGS. 7, 8, and 9 are schematics in illustration of the oscillation of the reed structure according to this invention;

FIG. 10 is an exploded view of the whole structure of FIG. 1;

FIG. 11 is a perspective, in partial section, of the downstream end cap as a mounting support for the reed structure according to this invention; and FIG. 12 is a schematic illustration of one form of output signal system according to this invention.

A single embodiment of this invention is illustrated throughout the drawings, and like reference numbers are applied to like elements throughout the drawings.

Figure 3:
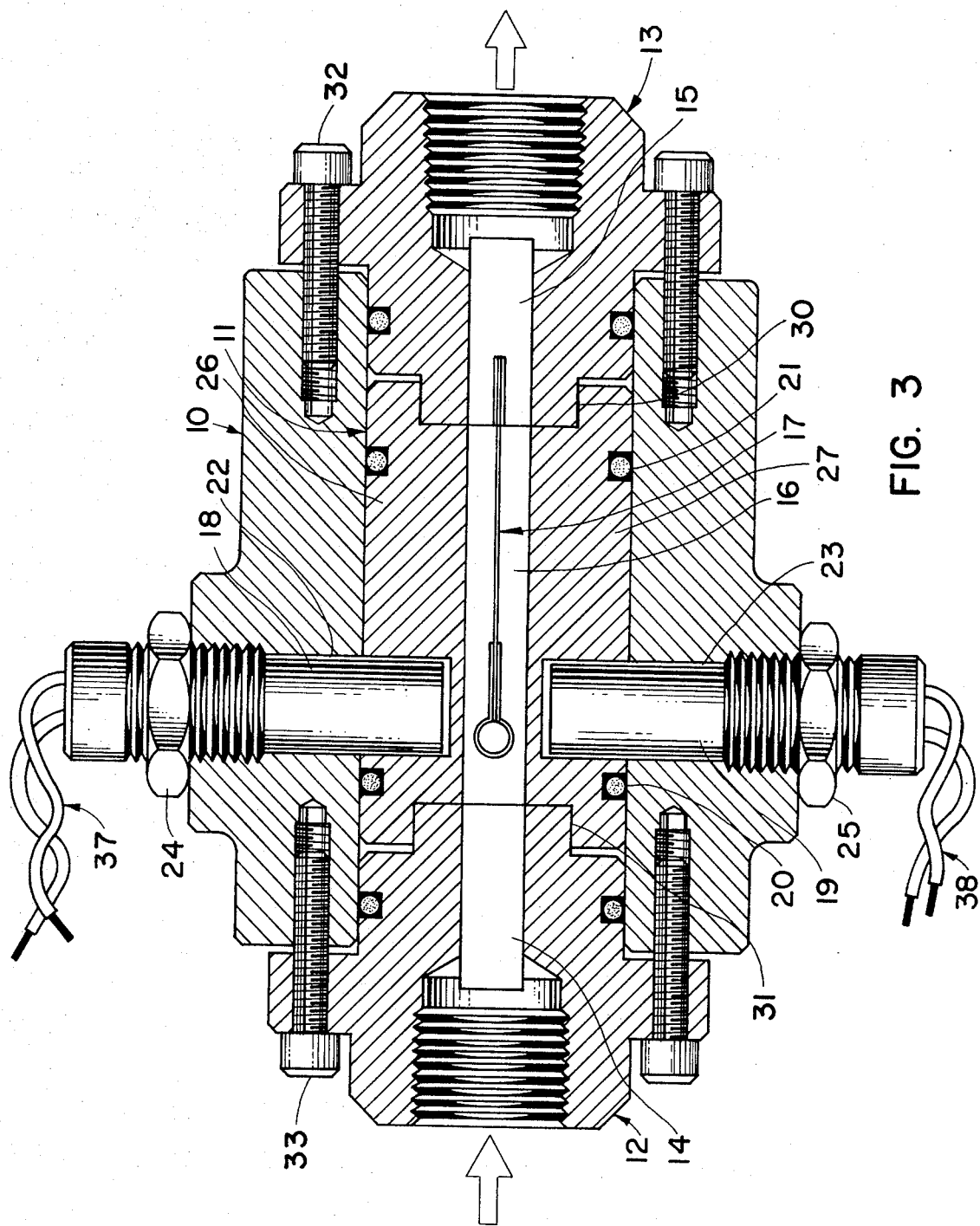
FIG. 3 is a vertical central section of the structure of FIG. 1.

With FIG. 3 as a central illustration, and consulting the other figures for further explanation, an oscillation fluid flowmeter according to this invention has an outer housing body 10 in the form of a generally cylindrical sleeve. An inner, split-sleeve body 11 is fitted within the sleeve form of the housing 10, and a pair of end-caps 12 and 13, up and down stream respectively, are fitted within the sleeve form of the housing 10 and endwise against the inner, split-sleeve body 11. Flow passage openings 14 and 15 are provided through the end caps 12 and 13 in continuance of a main flow passage 16 defined by the interior of the inner, split-sleeve body 11. An oscillator reed assembly 17 is end mounted in the inner portion of the downstream end cap 13. The reed assembly 17 extends therefrom, upstream of the fluid flow passage and within the flow passage 16, essentially axially thereof.

A pair of output signal magnetic devices 18 and 19 are mounted in the housing 10 and sleeve 11 oppositely with respect to the oscillator reed assembly 17, extending through the outer housing 10 and into the inner sleeve 11. These magnetic devices cooperate with magnetic material in the oscillating reed assembly 17 as signal takeoff means in representation of fluid rate of flow through the meter, expressed in terms of the oscillation of the reed assembly 17. Each movement of the reed assembly 17 toward and away from each of the electrodes provides a magnetic pulse which may be sensed and utilized as a working output for indication, recording, control or the like.

The housing 10 is a body with a cylindrical opening therethrough. The split-sleeve body 11 is mounted in this opening, with suitable O-rings such as 20 and 21 in fluid sealing relation between the housing 10 and the sleeve body 11, at up and down stream locations, respectively, as related to the signal pick-off units 18 and 19. These units are mounted in the body 10 in openings transversely through the housing 10. The signal pick-off units are extended inwardly into well openings 22 and 23 in the split-sleeve body 11, and terminate just short of the walls of the flow passage 16 in the inner body 11. The signal pick-off units are threaded into the housing 10 and are secured by outer nuts 24 and 25.

The flow passage system through this flowmeter includes a narrow rectangular cross-section central flow passage 16 between end cap passages 14 and 15. At their inner ends the end cap passages are rectangular in cross-section, in matching continuance of the form of the central flow passage 16. At their outer ends, the passages 14 and 15 are round, to facilitate pipe-line connections. Thus, without significantly changing flow volume, the flow stream passage of this flowmeter is formed into a narrow central rectangle cross-section in which the reed assembly oscillates in the narrow direction. Accordingly, the reed assembly oscillates between essentially flat walls of the flow passage.

Figure 6:
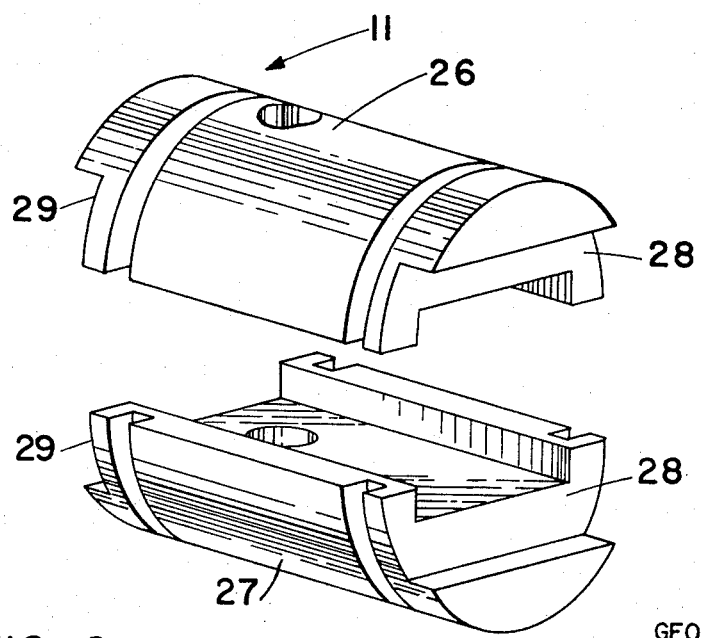
FIG. 6 is an exploded view of the inner, split-sleeve, flow passage structure of FIG. 3.

In order to facilitate the manufacturing formation of the rectangular central passage 16, the inner sleeve assembly 11 is formed in two cylinder halves, FIG. 6, at 26 and 27. Further, in FIG. 6, end slot rectangular recesses 28 and 29 are formed in the inner sleeve assembly 11 to receive similar rectangular boss forms 30 and 31, FIG. 3, on the inner ends of the end caps 12 and 13. Thus, on an end-interchangeable basis, the reed assembly 17, mounted in the end-cap 13, will always be located and positioned suitably, lengthwise and rotationally, within the rectangular flow passage 16. The end caps are also suitably located and positioned with respect to the housing 10 by mounting bolts such as 32 and 33. Accordingly, the reed assembly 17 is also always suitably located with respect to the signal pick-off units 18 and 19 and the openings therefor through the housing 10 and in the inner sleeve assembly 11.

Figure 4:
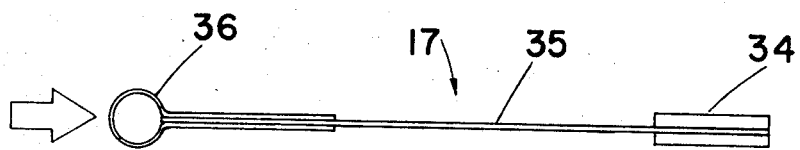
FIG. 4 is a side view of the oscillator reed structure of FIG. 2.
Figure 5:
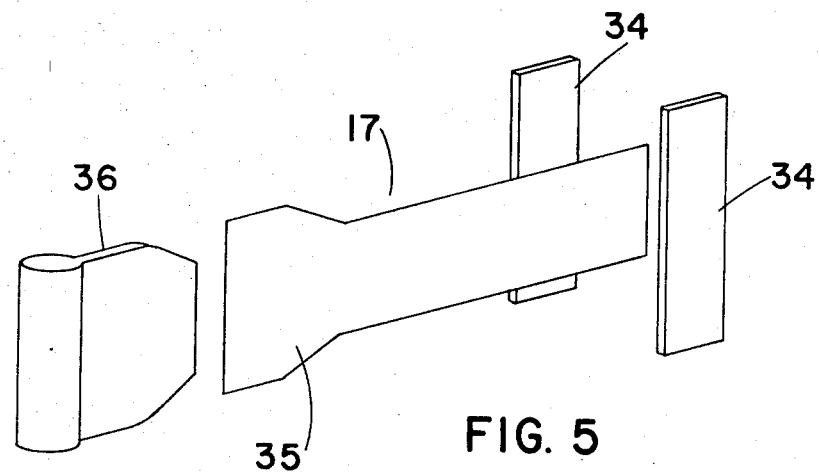
FIG. 5 is an exploded perspective of the reed structure of FIG. 4.

The reed assembly 17, FIGS. 3, 4, and 5, includes a pair of fixed end mounting cross-plates 34. A main 'sail' body 35, as a strip of magnetic material is provided with a tubular, leading edge cross-piece 36 as a bulbous, leading edge of the reed assembly, to which the fluid stream is first applied. The sail body may be essentially rigid but resiliently mounted. Vortex shedding of the fluid stream occurs from the bulbous leading edge to establish downstream differential pressures across the reed structure. Such differentials initiate oscillations of the reed assembly, upon start-up from a condition of essentially zero flow, when the reed is ordinarily at rest along the length axis of the flow passage.

In assembly, the downstream end of the reed strip 35 is spot-welded to the clamp strips 34, whose ends are force-fitted into slots in the inner end of the end cap 13. Rearward extensions of the cylinder portion 36 are provided for assembly and are spot welded to the upstream end of the reed strip 35.

Thus the leading edge 36 of the reed 17, FIG. 3, is located adjacent the output units 18 and 19. The oscillatory action of the reed assembly 17 is illustrated in FIG. 7. In the sweep of oscillation as in FIG. 8 and 9, the reed intermittently and temporarily divides the flow stream. In FIG. 8, the upper stream division, above the reed, is tending to decreasing speed, higher pressure condition, and the lower stream, below the reed, is tending to increasing speed and lower pressure. The reed tends to move toward the position shown in FIG. 9, whereafter it again reverses to continue the oscillation.

The vortex shedding imbalance occurs at start-up with the reed stationary because, even though normally centered, any usual mechanical manufacture and assembly practices leave the reed slightly uncentered. Even with perfect centering, inevitable slight flow disturbances would start the vortex-shedding action.

Signal take-off simplicity and possible variety are important features of this invention. While it may suitably be accomplished in many ways, it is indicated herein as magnetic. FIG. 1 illustrates electrical connections 37 and 38 from the flowmeter output units 18 and 19 to a recorder 39 which includes suitable systems for responding to electrical pulse signals on a frequency basis representative of fluid flow rate as expressed linearly in oscillations of the reed assembly 17.

A magnet signal take-off system is schematically illustrated in FIG. 12 with a permanent magnet 40 having an unenergized electrical coil 41 wound thereabout. As the reed 27, of magnetic material, approaches the magnet 40, it distorts the magnetic field thereof and this movement of distortion induces an electrical signal in the coil 41. Accordingly, flow velocity, in terms of reed oscillation, is expressed in electrical pulse frequency terms in the coil 41.

In FIG. 7, in the initial start-up position A of the reed, alternately shedding vortices 2 initiate small amplitude oscillation tendencies in the reed. These tendencies may be increased with increased flow, and may be aided by simple flow drag transverse vector forces. A position approaching full amplitude is indicated in FIG. 8 as position B.

In FIG. 8, on the side of the reed near the flow passage wall, a dotted line triangle 7 indicates the area and nature of a situation of increasing flow area, decreasing flow velocity, over the length of the reed. Below the reed, on the side of the reed distant from the flow passage wall, a dotted line triangle 8, indicates the area and nature of a situation of decreasing flow area and increasing flow velocity. These situations are reversed as in FIG. 9, with respect to the opposite wall of the flow passage.

This invention, therefore, provides a new and useful flowmeter, for liquids or gases, with frequency output on a linear basis over a significant range of operation.

As many embodiments may be made of the above invention, and as changes may be made in the embodiment set forth above without departing from the scope of the invention, it is to be understood that all matter hereinbefore set forth and in the accompanying drawings is to be interpreted as illustrative only and not in a limiting sense.

I claim:

1. A fluid oscillator flowmeter comprising a flow passage, a flexure reed mounted lengthwise in said passage and capable of oscillating movement essentially from wall to wall transversely of said passage in response to fluid flow through said passage, and sensor means responsive to said oscillatory movement in representation of said fluid flow;
    wherein said reed is provided with resilient opposition to transversely outward movement of said reed;
    wherein said reed is in the form of a planar sail, and means on the upstream portion of said sail and within said passage for producing said vortex shedding and consequent differential pressures to initiate said oscillatory movement;
    wherein full oscillation of said reed is sustained by reversals of two essentially parallel and confined flow systems, on opposite sides of said reed; and
    wherein said reed is secured to a fixed axis mounting at one end thereof and is positioned with the other end free and upstream of said fixed axis mounting.

2. A flowmeter comprising a flow passage, a resilient reed structure extending upstream in said flow passage from a fixed downstream mounting, said reed structure providing a sail form extending an effective distance transversely of said flow passage, vortex shedding means as a part of said reed structure, for producing vortices on opposite sides of said sail form, said shedding means being located within said passage significantly upstream of said downstream mounting and significantly coextensive with said sail form in the direction of said transverse extent of said sail form, and sensor means responsive to oscillation of said reed structure.

3. A fluid flow measuring device comprising a sleeve housing, an inner sleeve mounted within said sleeve housing and defining a flow passage through said device, a pair of end-caps for said sleeve housing, with flow passages through said end-caps in continuance of said flow passage defined by said inner sleeve, an oscillator reed end mounted in one of said end-caps and extending into said flow passage defined by said inner sleeve flow passage for oscillation in response to differential pressure effects on said oscillator reed by fluid flow through said device, means on said reed for producing vortex shedding and consequent differential pressures to initiate said oscillation of said reed, and sensor means providing a basis for detection of the oscillations of said reed member as a measure of fluid flow through said inner sleeve flow passage.

4. A measuring device according to claim 3, wherein said oscillator reed is mounted in the downstream one of said end caps, said reed extending therefrom upstream of said flow passage.

5. A measuring device according to claim 3 wherein said vortex shedding means is a bulbous, cylindrical formation, transversely of said flow passage, at the free end of said reed.

6. A measuring device according to claim 3 wherein said reed mounting end-cap is provided with mutual locating means both with respect to said housing and with respect to said inner sleeve whereby said reed is repeatably located and positioned within said inner sleeve and with respect to said housing, for example, with respect to signal take-off means in said housing, said signal take-off means comprising said sensor.

7. A fluid flow measuring device according to claim 3 wherein said inner sleeve is a split-sleeve assembly whose inner cross-section is rectangular.

8. A fluid flow measuring device according to claim 3 wherein said inner sleeve is provided with an inner cross-section in rectangular form, wherein the inner ends of said end-cap flow passages are in continuance of said rectangular form, and wherein the outer ends of said end-cap flow passages are essentially circular.

9. An oscillating reed flowmeter comprising a reed member with one end fixed in a fluid flow passage, with an enlarged, free portion of said reed member located upstream of said fixed end, in said passage and positioned with respect to fluid flow in said passage on a wall to wall reed oscillation and fluid vortex shedding basis from said enlarged portion of said reed, and sensor means for detecting oscillations of said reed.

10. A fluid flowmeter wherein oscillations of a reed member are produced by fluid flow through said meter, said oscillations being initiated by vortex shedding effect of said fluid with respect to said reed member,
    said flowmeter comprising a fluid passage, a thin and relatively wide reed member mounted for said oscillations about a fixed axis in said fluid passage with a bulbous formation on and laterally coextensive with said reed member and in said passage upstream of said fixed axis whereby vortex shedding of said fluid with respect to said bulbous formation provides pressure differential impetus to initiate oscillation of said reed member, and
    means for providing a basis for detection of the oscillations of said reed member as a measure of fluid flow through said passage.

11. A fluid flowmeter according to claim 10, wherein oscillations of said reed member, as initiated by said vortex shedding, are developed and continued by said fluid flow transversely essentially wall to wall of said fluid passage, as said reed, in the course of its oscillation, divides said flow passage into a combination of narrow and wide flows, with these flows alternated from one side of the reed to the other.

12. A fluid oscillator flowmeter in which a reed is pulsed by vortex shedding and sustained in full oscillation by reversing pressure effects, said flowmeter comprising a flow passage, a planar sail reed mounted in said passage for flow induced oscillation a significant distance in wall to wall direction transversely thereof about a fixed axis, vortex shedding means secured to said reed within said passage and upstream of said axis for providing oscillation inducing directly applied differential pressures on opposite sides of the full effective length of said reed and means responsive to said oscillation for producing an output signal representative of flow through said flowmeter.

13. A flowmeter according to claim 12 in which said oscillation responsive means is magnetic.

14. A fluid flowmeter comprising a narrow rectangular cross-section flow passage, a reed mounted in said passage for short stroke oscillations in the direction of and limited by the narrow dimension of said rectangular cross-section, said reed having a free end upstream of said passage, a vortex-shedding form on said free end of said reed, and output signal means responsive to said oscillations of said reed.

15. A fluid oscillator flowmeter comprising a flow passage, a flexible reed mounted lengthwise in said flow passage for oscillation over the full length of one transverse dimension of said passage, said reed extending upstream from a downstream fixed support, said reed comprising a wide and thin planar sail body with a vortex shed form on said body in said passage and upstream of said fixed support, whereby initial oscillations of said reed are produced by fluid flow vortex shedding effect on said reed, and full oscillations are sustained by reversing pressure effects between the walls of said passage and said reed, and means for sensing said full oscillations in linear representation of fluid flow through said flowmeter.

16. In a fluid flowmeter, a flow passage, an oscillator reed assembly in said flow passage, said reed assembly being mounted downstream of said passage at one end of said assembly, and said assembly extending upstream from said mounting to a free end of said assembly, said reed assembly comprising an essentially flat strip sail body with a bulbous bow across said sail body along the free end edge thereof, said flow passage being formed essentially as a narrow rectangle in cross-section, with said sail strip as a planar member essentially perpendicular to the short side of said rectangular passage, and said flowmeter including sensor means for detecting oscillations of said reed assembly.

17. An oscillating flowmeter comprising a flow passage, a flexible reed having a downstream end fixed in said passage, vortex shedding means on said reed and in said passage for creating a Von Karman vortex street upon the application of fluid flow to said means, said reed being located lengthwise in said street in such manner that a string of vortices of said street runs along each side of said reed for application of differential pressure to said reed with resultant oscillation of said reed in response to said flow application, and sensor means for detecting said oscillations of said reed, wherein said vortex shedding means is a cylindrical form with a diameter significantly greater than the thickness of the reed on and transversely across the upstream end of said reed and laterally coextensive therewith, with said upstream end as the free end of said reed.

18. A fluid oscillator flowmeter comprising:
a flow passage;
an oscillator reed member with significantly greater width than thickness, extending along and entirely within said passage to essentially divide flow in said passage into two streams each confined between a portion of the inner wall of said passage and a side of said reed member in direct pressure engagement with essentially the full length of said reed member;
means for supporting said reed member within said passage, without significant distortion of said streams by said supporting means, for oscillation transversely of said passage, essentially from wall to wall thereof;
said reed member having a free portion extending upstream in said passage, from said support means;
means within said passage as a part of the upstream end of said reed member and essentially coextensive with said width of said reed, for producing vortex shedding in said two flow streams and on opposite sides of said reed member as oscillation forces on said reed member; and
sensor means mounted within the influence of and responsive to said oscillation, in representation of fluid flow in said passage.

19. A fluid flowmeter comprising a flow passage, a reed mounted in said passage for short stroke oscillations transversely of said passage and limited by the inner walls of said passage, said reed having a free end upstream in said passage, a vortex-shedding form on said free end of said reed, and output signal means responsive to said oscillations of said reed.

* * * * *